US011000797B2

(12) United States Patent
Maher et al.

(10) Patent No.: US 11,000,797 B2
(45) Date of Patent: May 11, 2021

(54) INTEGRATION OF COLD SOLVENT AND ACID GAS REMOVAL

(71) Applicants: David W. Maher, Spring, TX (US); Shwetha Ramkumar, Cypress, TX (US); P. Scott Northrop, The Woodlands, TX (US); Robert D. Denton, Bellaire, TX (US)

(72) Inventors: David W. Maher, Spring, TX (US); Shwetha Ramkumar, Cypress, TX (US); P. Scott Northrop, The Woodlands, TX (US); Robert D. Denton, Bellaire, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 250 days.

(21) Appl. No.: 16/102,297

(22) Filed: Aug. 13, 2018

(65) Prior Publication Data
US 2019/0054416 A1    Feb. 21, 2019

Related U.S. Application Data

(60) Provisional application No. 62/548,172, filed on Aug. 21, 2017.

(51) Int. Cl.
*B01D 53/14*    (2006.01)
*B01D 61/24*    (2006.01)
(Continued)

(52) U.S. Cl.
CPC ..... *B01D 53/1462* (2013.01); *B01D 53/1418* (2013.01); *B01D 53/1425* (2013.01);
(Continued)

(58) Field of Classification Search
None
See application file for complete search history.

(56) References Cited

U.S. PATENT DOCUMENTS

| 1,951,647 A | 3/1934 | Cooke | 196/46 |
| 2,847,200 A | 8/1958 | Ung | 202/158 |

(Continued)

FOREIGN PATENT DOCUMENTS

| CA | 2144585 | 6/1996 | B01D 53/52 |
| DE | 10162457 | 7/2003 | B01D 3/32 |

(Continued)

OTHER PUBLICATIONS

Shojaeian et al, "Solubility and density of carbon dioxide in different aqueous alkanolamine solutions blended with 1-butyl-3-methylimidazolium acetate ionic liquid at high pressure", Journal of Molecular Liquids, 187 (2013) 218-225). (Year: 2013).*

(Continued)

*Primary Examiner* — Anita Nassiri-Motlagh
(74) *Attorney, Agent, or Firm* — ExxonMobil Upstream Research Company—Law Department

(57) ABSTRACT

A method of separating impurities from a natural gas stream. The natural gas stream is cooled through heat exchange with one or more process streams to produce a chilled gas stream, which is contacted with a lean solvent stream in a contactor to separate hydrogen sulfide ($H_2S$) from the chilled gas stream, thereby producing a rich solvent stream and a partially-treated gas stream. Carbon dioxide ($CO_2$) and $H_2S$ are separated from the partially-treated gas stream in a membrane separation system, thereby creating a fully-treated gas stream and a permeate gas stream, the permeate gas stream being comprised primarily of $H_2S$ and $CO_2$, and the fully-treated gas stream being comprised primarily of natural gas. The fully-treated gas stream and the permeate gas stream are at a lower temperature than the partially- (Continued)

treated gas stream. The fully-treated gas stream and the permeate gas stream comprise the one or more process streams.

9 Claims, 7 Drawing Sheets

(51) Int. Cl.
*C10L 3/10* (2006.01)
*B01D 53/18* (2006.01)
*B01D 53/22* (2006.01)
*B01D 11/00* (2006.01)

(52) U.S. Cl.
CPC ......... *B01D 53/185* (2013.01); *B01D 53/229* (2013.01); *B01D 61/246* (2013.01); *C10L 3/103* (2013.01); *C10L 3/104* (2013.01); *C10L 3/106* (2013.01); *B01D 2011/007* (2013.01); *B01D 2252/204* (2013.01); *B01D 2256/245* (2013.01); *B01D 2257/304* (2013.01); *B01D 2257/504* (2013.01); *C10L 2290/06* (2013.01); *C10L 2290/10* (2013.01); *C10L 2290/46* (2013.01); *C10L 2290/541* (2013.01); *C10L 2290/545* (2013.01); *C10L 2290/548* (2013.01)

(56) References Cited

U.S. PATENT DOCUMENTS

| | | | |
|---|---|---|---|
| 3,767,766 A | 10/1973 | Tjoa et al. | 423/220 |
| 3,773,472 A | 11/1973 | Hausberg et al. | 422/169 |
| 3,989,811 A | 11/1976 | Hill | 423/573 |
| 4,073,832 A | 2/1978 | McGann | 261/118 |
| 4,204,934 A | 5/1980 | Warren et al. | 204/186 |
| 4,318,717 A | 3/1982 | Sohier | 55/71 |
| 4,369,167 A | 1/1983 | Weir, Jr. | 423/210 |
| 4,405,580 A | 9/1983 | Stogryn et al. | 423/226 |
| 4,421,725 A | 12/1983 | Dezael et al. | 423/228 |
| 4,589,896 A | 5/1986 | Chen et al. | 62/28 |
| 4,603,035 A | 7/1986 | Connell et al. | 423/226 |
| 4,678,648 A | 7/1987 | Wynn | 423/228 |
| 4,701,188 A | 10/1987 | Mims | 55/20 |
| 4,752,307 A | 6/1988 | Asmus et al. | 55/73 |
| 4,824,645 A | 4/1989 | Jones et al. | 423/226 |
| 4,885,079 A | 12/1989 | Eppig et al. | 208/13 |
| 5,067,971 A | 11/1991 | Bikson et al. | 55/16 |
| 5,085,839 A | 2/1992 | Scott et al. | 423/210 |
| 5,091,119 A | 2/1992 | Biddulph et al. | 261/114.3 |
| 5,093,094 A | 3/1992 | Van Kleeck et al. | 423/224 |
| 5,186,836 A | 2/1993 | Gauthier et al. | 210/512.1 |
| 5,209,821 A | 5/1993 | Shaw et al. | 159/4.01 |
| 5,439,509 A | 8/1995 | Spink et al. | 95/166 |
| 5,462,584 A | 10/1995 | Gavlin et al. | 95/231 |
| 5,603,908 A | 2/1997 | Yoshida et al. | 423/220 |
| 5,648,053 A | 7/1997 | Mimura et al. | 423/210 |
| 5,664,426 A | 9/1997 | Lu | 62/93 |
| 5,713,985 A | 2/1998 | Hamilton | 95/90 |
| 5,735,936 A | 4/1998 | Minkkinen et al. | 95/49 |
| 5,810,897 A | 9/1998 | Konosu | 55/418 |
| 5,837,105 A | 11/1998 | Stober et al. | 203/40 |
| 5,907,924 A | 6/1999 | Collin et al. | 45/194 |
| 5,988,283 A | 11/1999 | Gann | 166/357 |
| 6,063,163 A | 5/2000 | Carmody | 95/187 |
| 6,071,484 A | 6/2000 | Dingman et al. | 423/229 |
| 6,089,317 A | 7/2000 | Shaw | 166/265 |
| 6,214,097 B1 | 4/2001 | Laslo | 96/236 |
| 6,228,145 B1 | 5/2001 | Falk-Pedersen et al. | 95/44 |
| 6,284,023 B1 | 9/2001 | Torkildsen et al. | 95/216 |
| 6,830,608 B1 | 12/2004 | Peters | 261/112 |
| 6,881,389 B2 | 4/2005 | Paulsen et al. | 423/210 |
| 7,018,451 B1 | 3/2006 | Torkildsen et al. | 95/216 |
| 7,128,276 B2 | 10/2006 | Nilsen et al. | 236/124 |
| 7,144,568 B2 | 12/2006 | Ricard et al. | 423/659 |
| 7,152,431 B2 | 12/2006 | Amin et al. | 62/637 |
| 7,175,820 B2 | 2/2007 | Minkkinen et al. | 423/228 |
| RE39,826 E | 9/2007 | Lu | 62/632 |
| 7,273,513 B2 | 9/2007 | Linga et al. | 95/235 |
| 7,560,088 B2 | 7/2009 | Keller et al. | 423/537.1 |
| 7,811,343 B2 | 10/2010 | Toma | 55/318 |
| 8,071,046 B2 | 12/2011 | Hassan et al. | 422/225 |
| 8,137,444 B2 | 3/2012 | Farsad et al. | 96/235 |
| 8,240,640 B2 | 8/2012 | Nakayama | 261/109 |
| 8,268,049 B2 | 9/2012 | Davydov | 95/199 |
| 8,336,863 B2 | 12/2012 | Neumann et al. | 261/115 |
| 8,343,360 B2 | 1/2013 | Schook | 210/788 |
| 8,454,727 B2 | 6/2013 | Dunne et al. | 95/51 |
| 8,475,555 B2 | 7/2013 | Betting et al. | 55/416 |
| 8,652,237 B2 | 2/2014 | Heldebrant et al. | 95/235 |
| 8,741,127 B2 | 6/2014 | Koseoglu et al. | 20/57 |
| 8,899,557 B2 | 12/2014 | Cullinane | 261/76 |
| 8,900,347 B2 | 12/2014 | Boulet et al. | 95/114 |
| 9,149,761 B2 | 10/2015 | Northrop et al. | 166/401 |
| 9,192,896 B2 | 11/2015 | Hassan et al. | B01F 7/00766 |
| 9,238,193 B2 | 1/2016 | Ji et al. | B01D 53/1468 |
| 9,353,315 B2 | 5/2016 | Heath et al. | C10G 5/06 |
| 9,599,070 B2 | 3/2017 | Huntington et al. | 60/39 |
| 9,764,252 B2 | 9/2017 | Whitney et al. | B01D 17/0217 |
| 9,902,914 B2 | 2/2018 | Mak | C10L 3/104 |
| 2001/0037876 A1 | 11/2001 | Oost et al. | 165/133 |
| 2003/0005823 A1 | 1/2003 | LeBlanc et al. | 95/149 |
| 2003/0155438 A1 | 8/2003 | Boee et al. | 239/533.2 |
| 2004/0092774 A1 | 5/2004 | Mimura | 564/497 |
| 2005/0006086 A1 | 1/2005 | Gramme | 166/105.5 |
| 2006/0123993 A1 | 6/2006 | Henriksen | 96/234 |
| 2006/0185320 A1 | 8/2006 | Dureiko | 52/749 |
| 2007/0205523 A1 | 9/2007 | Kojima | 261/79.2 |
| 2008/0006011 A1 | 1/2008 | Larnholm et al. | 55/421 |
| 2008/0107581 A1 | 5/2008 | Sparling et al. | 423/222 |
| 2008/0115532 A1 | 5/2008 | Jager | 62/620 |
| 2008/0190291 A1 | 8/2008 | Krehbiel et al. | 95/241 |
| 2008/0257788 A1 | 10/2008 | Leito | 209/44 |
| 2008/0290021 A1 | 11/2008 | Buijs et al. | 210/500.27 |
| 2009/0213687 A1 | 8/2009 | Linga et al. | 366/167.2 |
| 2009/0241778 A1 | 10/2009 | Lechnick et al. | 95/177 |
| 2010/0229725 A1 | 9/2010 | Farsad et al. | 96/74 |
| 2011/0036122 A1 | 2/2011 | Betting et al. | 62/636 |
| 2011/0168019 A1 | 7/2011 | Northrop et al. | 95/186 |
| 2011/0185633 A1 | 8/2011 | Betting et al. | 48/127.5 |
| 2011/0217218 A1 | 9/2011 | Gupta | 423/228 |
| 2011/0296869 A1 | 12/2011 | Buhrman et al. | 62/617 |
| 2012/0060691 A1 | 3/2012 | Bieri et al. | 95/270 |
| 2012/0204599 A1 | 8/2012 | Northrop et al. | 62/617 |
| 2012/0240617 A1 | 9/2012 | Weiss et al. | 62/611 |
| 2013/0017144 A1 | 1/2013 | Menzel | 423/542 |
| 2014/0033921 A1 | 2/2014 | Peck et al. | 95/269 |
| 2014/0123851 A1 | 5/2014 | Jamtvedt et al. | 95/149 |
| 2014/0245889 A1 | 9/2014 | Hamre et al. | 95/223 |
| 2014/0331862 A1 | 11/2014 | Cullinane et al. | 95/186 |
| 2014/0335002 A1 | 11/2014 | Northrop et al. | 423/228 |
| 2014/0366446 A1 | 12/2014 | Sharma et al. | 48/127.3 |
| 2014/0373714 A1 | 12/2014 | Cloud et al. | 95/273 |
| 2015/0013539 A1 | 1/2015 | Eriksen et al. | 95/172 |
| 2015/0030524 A1* | 1/2015 | Ji | B01D 53/1468 423/437.1 |
| 2015/0083425 A1 | 3/2015 | Sullivan et al. | |
| 2015/0135954 A1 | 5/2015 | Li et al. | |
| 2015/0191360 A1 | 7/2015 | Weiss et al. | C01B 31/20 |
| 2015/0267871 A1 | 9/2015 | Murray, Sr. et al. | F17D 3/01 |
| 2015/0322580 A1 | 11/2015 | Little | 205/554 |
| 2015/0352463 A1 | 12/2015 | Grave et al. | B01D 3/26 |
| 2016/0060190 A1 | 3/2016 | Trucko et al. | C07C 7/005 |
| 2016/0136569 A1 | 5/2016 | Lee et al. | B01D 53/18 |
| 2016/0199774 A1 | 7/2016 | Grave et al. | 95/235 |
| 2016/0236140 A1 | 8/2016 | Northrop et al. | 95/210 |
| 2016/0263516 A1 | 9/2016 | Freeman et al. | 423/226 |
| 2016/0288045 A1 | 10/2016 | Kramer et al. | B01D 53/1493 |
| 2016/0303506 A1* | 10/2016 | Cnop | C10L 3/101 |
| 2017/0114295 A1* | 4/2017 | Mak | C10L 3/103 |
| 2017/0145803 A1 | 5/2017 | Yeh et al. | E21B 43/36 |
| 2017/0157553 A1 | 6/2017 | Northrop et al. | 96/314 |
| 2017/0184021 A1 | 6/2017 | Huntington et al. | F02C 3/34 |
| 2017/0239612 A1 | 8/2017 | Mondkar et al. | B01D 53/14 |
| 2018/0071674 A1 | 3/2018 | Freeman et al. | 423/228 |

(56) References Cited

U.S. PATENT DOCUMENTS

| | | | | |
|---|---|---|---|---|
| 2018/0361307 A1 | 12/2018 | Yeh et al. | ........... | B01D 53/1406 |
| 2018/0361309 A1 | 12/2018 | Yeh et al. | ............ | B01D 53/185 |
| 2018/0362858 A1 | 12/2018 | Ramkumar et al. | ........................ C10G 25/003 | |

FOREIGN PATENT DOCUMENTS

| | | | | |
|---|---|---|---|---|
| EP | 0191985 | 8/1986 | ............ | B01D 53/18 |
| EP | 0301623 | 2/1989 | ............ | B01D 53/14 |
| EP | 1438484 | 4/2003 | ............ | B01D 17/02 |
| EP | 1141520 | 5/2003 | ............ | E21B 43/40 |
| EP | 1340536 | 9/2003 | ............ | B01J 19/30 |
| EP | 2134446 | 9/2015 | ............ | B01D 54/04 |
| GB | 1234862 | 6/1971 | ............ | B01D 53/18 |
| GB | 1377026 | 12/1974 | ............ | B01D 47/10 |
| GB | 1579249 | 11/1980 | ................ | H01J 1/13 |
| GB | 2079177 | 1/1982 | ............ | B01D 53/18 |
| GB | 2094951 | 9/1982 | ................ | F22B 3/04 |
| GB | 2414688 | 12/2006 | ............ | B01D 53/26 |
| JP | 48-066073 | 9/1971 | ............ | B01D 47/10 |
| JP | 53-032109 | 3/1978 | ................ | A61K 9/08 |
| JP | 06-170153 | 12/1992 | ............ | B01D 53/34 |
| JP | 2014-000500 | 1/2014 | ............ | B01D 53/14 |
| WO | WO1993/010883 | 6/1993 | ............ | B01D 53/14 |
| WO | WO1997/046304 | 12/1997 | ............ | B01D 53/26 |
| WO | WO1999/013966 | 3/1999 | ............ | B01D 53/18 |
| WO | WO2000/056844 | 9/2000 | ................ | C10L 3/10 |
| WO | WO2002/032536 | 4/2002 | ............ | B01D 17/00 |
| WO | WO2003/072226 | 9/2003 | ............ | B01D 53/14 |
| WO | WO2004/070297 | 8/2004 | ................ | F25J 3/06 |
| WO | WO2009/140993 | 11/2009 | ............ | B01D 45/16 |
| WO | WO2013/136310 | 9/2013 | ............ | B01D 53/14 |
| WO | WO2014/042529 | 3/2014 | | |
| WO | WO2014/094794 | 6/2014 | ............ | B01D 17/04 |
| WO | WO2014/106770 | 7/2014 | | |
| WO | WO2015/013539 | 1/2015 | ............ | H04W 52/36 |
| WO | WO2015/105438 | 7/2015 | ............ | B01D 53/14 |
| WO | WO2015/167404 | 11/2015 | ............ | B01D 53/22 |
| WO | WO2016/064825 | 4/2016 | ............ | B01D 53/48 |

OTHER PUBLICATIONS

U.S. Appl. No. 62/548,171, filed Aug. 21, 2017, Denton, Robert D. et al.

U.S. Appl. No. 62/548,172, filed Aug. 21, 2017, Denton, Robert D. et al.

Carter, T. et al. (1998) "Addition of Static Mixers Increases Capacity in Central Texas Gas Plant," *Proc. of the 77th GPA Annual Conv.*, pp. 110-113.

Dow Chemical Company (Mar. 3, 2015) "Product Safety Assessment," *SELEXOL Solvents Product Brochure*, 3 pages.

Garrison, J. et al. (2002) "Keyspan Energy Canada Rimbey Acid Gas Enrichment with FLEXSORB SE PLUS Technology," *Proceedings 2002 Laurance Reid Gas Conditioning Conf.*, Norman, OK, 8 pgs.

Hanna, James M. (2009) "Qatargas Expansion Projects: Why Change the Gas Treating Concept from Sulfinol-D," *OSGAT 2009 Proceedings 5th Int'l Conf.*, Mar. 31-Apr.1, Abu Dhabi, UAE, 33 pgs.

Jones, S. G. et al. (2004) "Design, Cost & Operation of an Acid Gas Enrichment & Injection Facility," *Proceedings 2004 Laurance Reid Gas Conditioning Conf.*, Norman, OK, 43 pgs.

Linga, H. et al. (2001) "New Selective $H_2S$ Removal Process for the Refining Industry," *Nat'l Petrochemical & Refiners Assoc.*, AM-01-35, 9 pgs.

Linga, H. et al. (2006) "Potentials and Applications for the Pro-Pure Co-Current Contactors," *13th Annual India Oil & Gas Rev. Symp.*, Mumbai, India, 24 pgs.

Nilsen, F. et al. (2001) "Selective $H_2S$ Removal in 50 Milliseconds," *Gas Processors Assoc., Europe Annual Conference*, 12 pgs.

Nilsen, F. et al. (2002) "Novel Contacting Technology Selectively Removes $H_2S$," *Oil & Gas Journal.*, 17 pgs.

Nilsen, F. et al. (2002) "Selective $H_2S$ Removal Applications using Novel Contacting Technology," *Gas Processors Assoc.*, 13 pgs.

Nova Molecular Technologies, Inc. (Jul. 17, 2008) "Product Brochure," *FLEXSORB SE*, 1 page.

ProSep, Inc. (2007) "Selective $H_2S$-Removal with Amines (ProCap)," *Product Brochure*, 32 pgs.

ProSep, Inc. (2014) "ProDry," *Gas Portfolio Product Brochure*, 1 pg.

ProSep, Inc. (2014) "ProScav," *Gas Portfolio Product Brochure*, 1 pg.

Puukilainen, E. et al. (2007) "Superhydrophobic Polyolefin Surfaces: Controlled Micro- an Nanostructures," *Dept. of Chemistry, Univ. of Joensuu*, Langmuir, v. 23, No. 13, pp. 7263-7268.

Royan, T. et al. (1992) "Acid Gas Enrichment using FLEXSORB," *Proceedings 1992 Laurance Reid Gas Conditioning Conf.*, Norman, OK, Mar. 2-4, 17 pgs.

Schutte & Koerting (2012) "Gas Scrubbers," *Product Brochure*, 14 pgs.

True, Warran R. (1994) "New Mobile Bay Complex Exploits Major Sour Gas Reserve," *Oil & Gas Journal*, v. 92, No. 21, 4 pgs.

Weiland, R. H. (2008) "Acid Gas Enrichment—Maximizing Selectivity," *Proceedings 2008 Laurance Reid Gas Conditioning Conf.*, Clarita, OK, 16 pgs.

Smith, W. B. (2010) "Typical Amine and Glycol Treating Unit Compared to Gas Membrane Separation System for Wellhead $CO_2$ Trimming" *Laurance Reid Gas Conditioning Conference*, Norman, OK, Feb. 21-24, 2010, pp. 417-436.

* cited by examiner

INTEGRATION OF COLD SOLVENT AND ACID GAS REMOVAL

CROSS REFERENCE TO RELATED APPLICATIONS

This application claims the priority benefit of U.S. Provisional Patent Application No. 62/548,172 filed Aug. 21, 2017 entitled INTEGRATION OF COLD SOLVENT AND ACID GAS REMOVAL, the entirety of which is incorporated by reference herein.

This application is related to U.S. Provisional Patent Application No. 62/548,171 filed Aug. 21, 2017 entitled INTEGRATION OF COLD SOLVENT AND ACID GAS REMOVAL, having common inventors and assignee and filed on an even date herewith, the disclosure of which is incorporated by reference herein in its entirety.

BACKGROUND

Field of Disclosure

The disclosure relates generally to the separation of impurities from a gas stream, such as a natural gas stream. More specifically, the disclosure relates to controlling a temperature of a gas stream, through the use of membrane separation technologies, for example, to reduce a reaction temperature of the gas stream and a solvent.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

Membranes work by preferentially permeating the acid gas (e.g., $CO_2$ and $H_2S$) through the membrane to a lower pressure, which cools both the process gas and permeate. Membranes are a bulk removal technology, so an amine-based clean-up step to remove $H_2S$ (and sometimes $CO_2$, though those applications are not the focus here) is almost always required to meet a pipeline gas specification.

Hindered amines, such as Flexsorb/SE, are engineered to preferentially remove $H_2S$ and let $CO_2$ slip through with the treated gas. The amines achieve selective $H_2S$ removal by reacting more quickly with $H_2S$ than $CO_2$. The value in becoming selective to $H_2S$ is that fewer molecules of amine are required to remove the $H_2S$ in the system because fewer side reactions with $CO_2$ take place. It is well known in the industry that at colder temperatures (50-80° F.) the reactions with $CO_2$ slow down significantly and the reaction becomes even further selective towards $H_2S$. It has been discovered that selectivity to $H_2S$ may be further enhanced, thus reducing solvent circulation by up to an order of magnitude, by chilling the solvent itself before contacting a gas stream. Such solvent chilling further reduces the $CO_2$ reaction rate. Additionally, providing a very short contact time between the gas stream and the amine solvent permits the amine just enough time to pick up the $H_2S$ but too little contact time to react with an appreciable amount of $CO_2$. Thus, more $CO_2$ slips, and less solvent is required. It would therefore be advantageous to provide a method and/or system that reduces the required amount of amine solvent used in a contactor operating with a membrane separation system.

SUMMARY

The present disclosure further provides a method of separating impurities from a natural gas stream. According to the method, the natural gas stream is cooled through heat exchange with one or more process streams to produce a chilled gas stream. The chilled gas stream is contacted with a lean solvent stream in a contactor to separate hydrogen sulfide ($H_2S$) from the chilled gas stream, thereby producing a rich solvent stream and a partially-treated gas stream. $H_2S$ and carbon dioxide ($CO_2$) are removed from the rich solvent stream to produce the lean solvent stream. The lean solvent stream is recirculated to the contactor. $CO_2$ and $H_2S$ are separated from the partially-treated gas stream in a membrane separation system, thereby creating a fully-treated gas stream and a permeate gas stream, the permeate gas stream being comprised primarily of $H_2S$ and $CO_2$, and the fully-treated gas stream being comprised primarily of natural gas. The fully-treated gas stream and the permeate gas stream are at a lower temperature than the partially-treated gas stream. The fully-treated gas stream and the permeate gas stream comprise the one or more process streams.

The present disclosure further provides a system for separating impurities from a natural gas stream. A heat exchanger cools the natural gas stream through heat exchange with one or more process streams, thereby producing a chilled gas stream. A contactor contacts the chilled gas stream with a lean solvent stream to separate hydrogen sulfide ($H_2S$) from the chilled gas stream, thereby producing a rich solvent stream and a partially-treated gas stream. A regenerator removes $H_2S$ and carbon dioxide ($CO_2$) from the rich solvent stream to produce the lean solvent stream that is recirculated to the contactor. A membrane separation system separates $CO_2$ and $H_2S$ from the partially-treated gas stream, thereby creating a fully-treated gas stream and a permeate gas stream. The permeate gas stream is comprised primarily of $H_2S$ and $CO_2$, and the fully-treated gas stream is comprised primarily of natural gas. The fully-treated gas stream and the permeate gas stream are at a lower temperature than the partially-treated gas stream. The fully-treated gas stream and the permeate gas stream comprise the one or more process streams.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
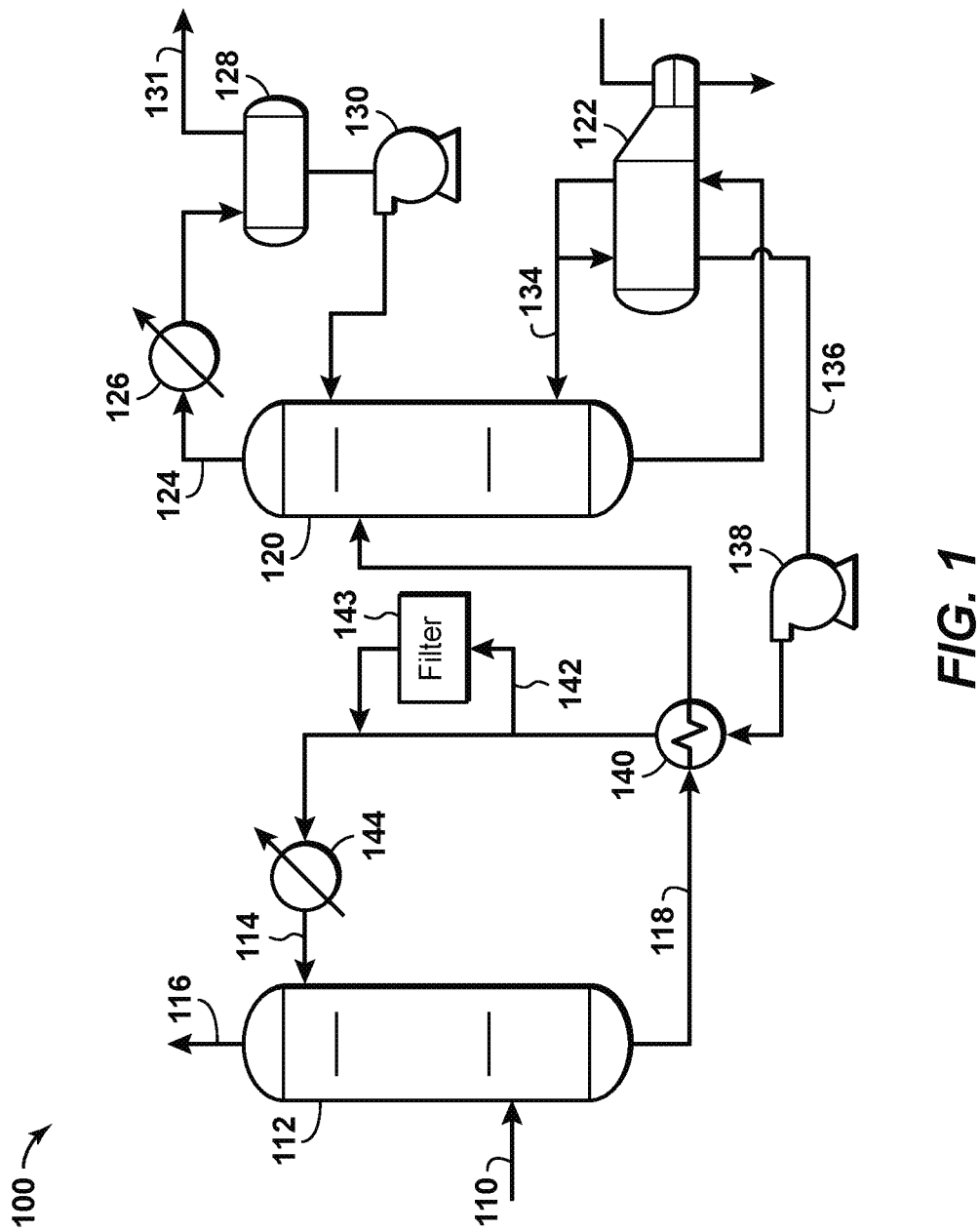
FIG. 1 is a schematic diagram of a natural gas separation system according to known principles.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"Exemplary" is used exclusively herein to mean "serving as an example, instance, or illustration." Any embodiment or aspect described herein as "exemplary" is not to be construed as preferred or advantageous over other embodiments.

"Acid gas" refers to any gas that produces an acidic solution when dissolved in water. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Co-current contactor" refers to a vessel that receives a gas stream and a separate solvent stream in such a manner that the gas stream and the solvent stream contact one another while flowing in generally the same direction.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties.

"Dehydrated natural gas stream" or "dry natural gas stream" refers to a natural gas stream that has undergone a dehydration process. Depending on the application, the dehydrated natural gas stream may have a water content of less than 150 parts per million (ppm), less than 100 ppm, less than 84 ppm, than 50 ppm, less than 7 ppm, or less than 0.1 ppm. Any suitable process for dehydrating the natural gas stream can be used. Typical examples of suitable dehydration processes include, but are not limited to dehydration using glycol or methanol.

As used herein, the term "dehydration" refers to the pre-treatment of a raw feed gas stream to partially or completely remove water and, optionally, some heavy hydrocarbons.

As used herein, the term "facility" is used as a general term to encompass oil and gas field gathering systems, processing platform systems, and well platform systems.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements can be present in small amounts. As used herein, hydrocarbons generally refer to components found in natural gas, oil, or chemical processing facilities.

The disclosure describes a method and system that takes advantage of the inherent cooling of the outputs of a membrane separation system to reduce the reaction temperature of a gas stream and a solvent in one or more contactor vessels. The contactor vessels may operate according to conventional counter-current contacting principles, or in an aspect, may comprise one or more co-current contacting systems. The solvent, which in a preferred aspect may be a hindered amine, may be cooled to below ambient temperature prior to being fed into the contactor vessels. One or more outputs of the membrane separation system, which may include a treated gas stream and a permeate gas stream, may likewise be cooled or chilled prior to being introduced into a contacting vessel. The effect of such cooling or chilling is that the reaction inside each contacting vessel may be adjusted to be more selective to hydrogen sulfide ($H_2S$) and less selective to carbon dioxide ($CO_2$). The $H_2S$-selectivity may be improved, thereby reducing the solvent flow required for separation.

FIG. 1 is a schematic diagram of a natural gas separation system according to known principles. System 100 may be used to treat a feed gas stream 110 that has a high sour gas content. The feed gas stream comprises natural gas as well as acid gases such as $CO_2$ and $H_2S$. The feed gas stream 110 enters a contactor vessel 112 that enables contact between the feed gas stream 110 and a lean solvent stream 114, which comprises a solvent that removes acid gases from the feed gas stream. A sweetened gas stream 116, having most if not all acid gases removed, exits toward the top of the contactor vessel 112. A rich solvent stream 118, which is mostly liquid, exits near the bottom of the contactor vessel and enters a regeneration vessel 120, in which heat from a reboiler 122 generates steam by partially boiling the rich solvent stream. This separates the acid gases from the solvent, which becomes leaner (i.e., containing less acid gases) as it moves down the regeneration vessel. The resulting acid gas stream 124 exits near the top of the regeneration vessel 120 and is cooled in a condenser 126, which condenses much of the water in the acid gas stream 124. This water is collected in a reflux accumulator 128 and is pumped using pump 130 back to the top of the regeneration vessel 120 as needed. An acid gas stream 131, rich in $H_2S$ and $CO_2$, exits the reflux accumulator 128 and is sent to a sulfur recovery unit (not shown) to remove the sulfur therefrom.

In the regeneration vessel 120, the downwardly moving lean solvent exits the bottom of the regeneration vessel. The solvent becomes leaner as the acid gases are stripped therefrom in the regeneration vessel. The lean solvent exits the bottom of the regeneration vessel and enters the reboiler 122, which heats the lean solvent to vaporize any remaining acid gas therein. A lean, hot amine stream is withdrawn from the reboiler, with a first portion 134 returned to the regeneration vessel 120 and a second portion 136 pumped using a circulation pump 138 to be fed through a heat exchanger 140. The heat exchanger 140 exchanges heat between the second portion 136 of the lean, hot amine stream and the rich solvent stream. A slip stream 142 of the second portion 136 may be taken for filtration by using a filter 143 according to known principles, to keep the second portion 136 clean. The second portion is then cooled to ambient temperature in cooler 144 to become the cooled, lean solvent stream 114, which is recycled to the contactor vessel 112.

Figure 2:
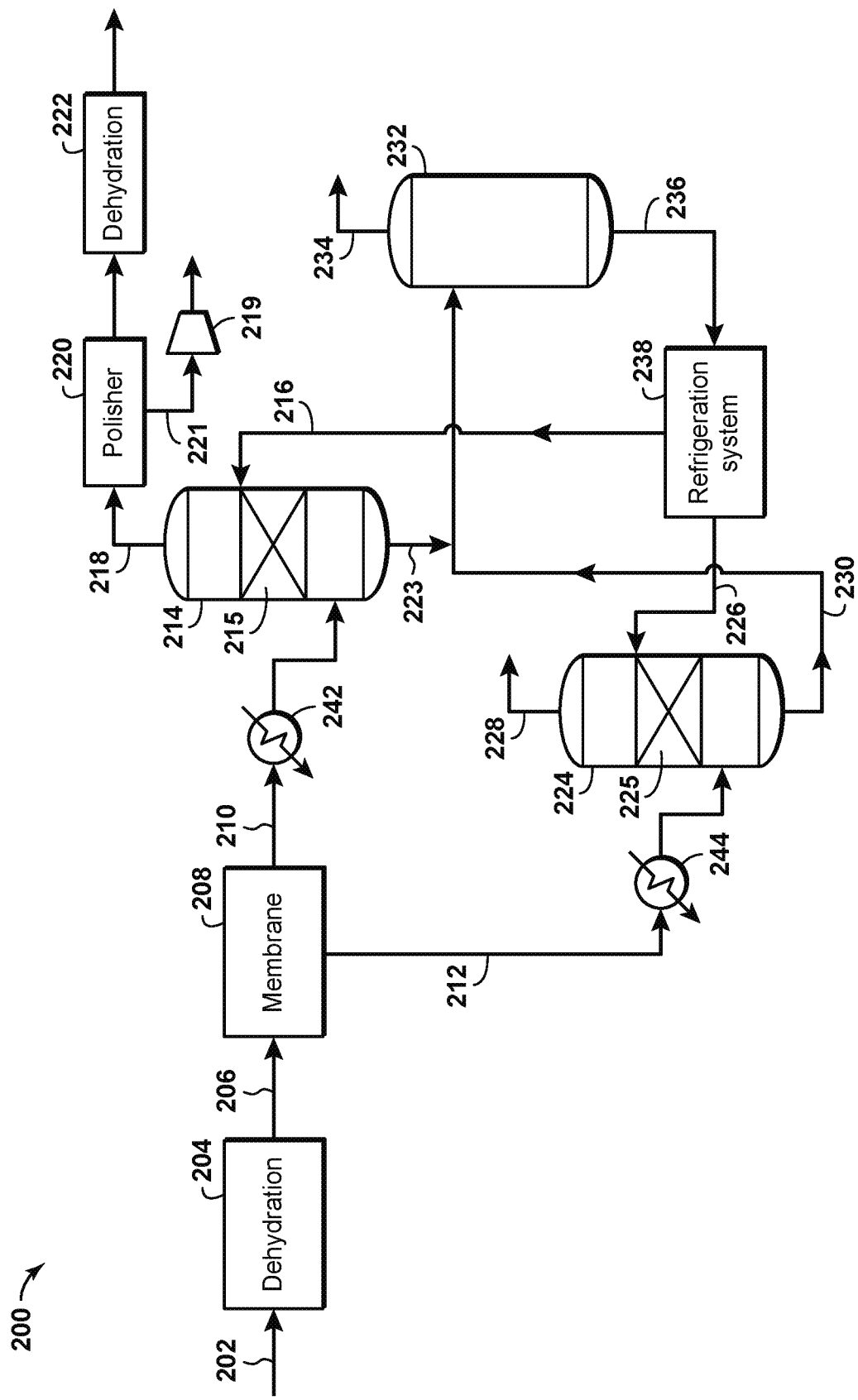
FIG. 2 is a schematic diagram of a natural gas separation system according to disclosed aspects.

FIG. 2 is a schematic diagram of a sour gas separation system 200 according to an aspect of the disclosure. Sour gas separation system 200 may be used to treat a feed gas stream 202 that has a high acid gas content. Water is removed from the feed gas stream 202 in a dehydrator 204 to the extent required to prevent water from condensing or hydrates forming in the membrane separation or chilling systems downstream. The dehydrator may be any known type of dehydration system, such as a glycol based solvent dehydration system and process, and more specifically, a triethylene glycol (TEG) unit. The dehydrated gas stream 206 passes through a membrane separation system 208. The membrane separation system 208 operates according to known principles to separate most of the carbon dioxide and hydrogen sulfide present in the dehydrated gas stream. For example, the membrane separation system 208 may produce a partially-treated gas stream 210 with a composition of 6% carbon dioxide ($CO_2$), about 500 parts per million (ppm) of hydrogen sulfide ($H_2S$), with the remainder being natural gas. The membrane separation system 208 may also produce a permeate gas stream 212 with a composition of 50%-95% $CO_2$ and 0.001%-5.0% $H_2S$, or 70-95% carbon dioxide and 0.1-2.0% $H_2S$, with the remainder being natural gas. Due to the nature of the membrane separation system, the temperature of the partially-treated gas stream 210 may be reduced to about 50° F. and its pressure reduced to about 500 psig, while the temperature of the permeate gas stream 212 may be reduced to about 70° F. and its pressure reduced to about 100 psig. A non-limiting example of a suitable membrane separation system can be found in "Typical Amine and Glycol Treating Unit Compared to Gas Membrane Separation System for Wellhead $CO_2$ Trimming" (Laurance Reid Gas Conditioning Conference, Norman, Okla., 2010).

According to disclosed aspects, the partially-treated gas stream 210 is introduced into a first cold solvent contactor 214. The first cold solvent contactor 214 contacts the partially treated gas stream 210 with a first chilled lean solvent stream 216 in a packing layer 215 to separate $H_2S$ out of the partially-treated gas stream 210. The first chilled lean solvent stream 216 may comprise a hindered amine, such as Flexsorb/SE, which has been engineered to preferentially remove $H_2S$ and permit $CO_2$ to slip through the process. The hindered amine achieves selective $H_2S$ removal by reacting more quickly with $H_2S$ than with $CO_2$. The $H_2S$-selective hindered amine requires fewer amine molecules to remove the $H_2S$ in the system, when compared with non-$H_2S$ selective amines, because fewer side reactions between the hindered amine and $CO_2$ take place. Furthermore, at temperatures between 50-80° F. the reaction between the hindered amine and $CO_2$ slow down significantly, and therefore the interaction between the partially-treated gas stream 210 (which is at a temperature of about 50° F.) and the hindered amine in the first chilled lean solvent stream 216 is even further selective towards $H_2S$. According to aspects of the disclosure, the selectivity toward $H_2S$ may therefore be enhanced by (a) chilling the first lean solvent stream 216 prior to entering the first cold solvent contactor 214, and (b) reducing the contact time between the partially-treated gas stream 210 and the first chilled lean solvent stream 216. Providing a very short contact time (via a shorter packing height or using a co-current contactor, for example) between the sour gas and amine allows the amine just enough time to pick up the $H_2S$ but too little contact time to react with an appreciable amount of $CO_2$. Thus, more $CO_2$ slips, and less solvent is required. It has been discovered that by enhancing $H_2S$ selectivity by doing steps (a) and (b) above, a much smaller solvent flow rate is needed to separate the $H_2S$ in the treated gas stream—up to an order of magnitude less than separators operating at higher temperatures. The use of a cold solvent is further described in United States Patent Publication No. 2017/0239612, titled "Cold Solvent Gas Treating System," the disclosure of which is incorporated by reference herein in its entirety.

A fully-treated gas stream 218 exits the top of the first cold solvent contactor 214. The fully-treated gas stream 218 is rich in natural gas and is very low in acid gas. Sometimes to meet product pipeline specifications, the $CO_2$ concentration in the fully-treated gas stream 218 may be further reduced in a polishing unit 220, which in an aspect may comprise a co-current contacting system such as is disclosed in United States Patent Application Publication No. 2015/0352463, "Contacting a Gas Stream with a Liquid Stream", the disclosure of which is incorporated by reference herein in its entirety. A carbon dioxide gas stream 221, separated from the fully-treated gas stream 218 in the polishing unit, may be re-compressed in a compressor 219 and combined with a cleaned $CO_2$ gas stream 228 as further described herein. In this manner, all the $CO_2$ extracted from the feed gas stream 202 can be recovered, essentially free of $H_2S$. Such $CO_2$ extraction and recovery is especially advantageous where there is a ready market for the $CO_2$. The fully-treated gas stream 218 may be further processed through a dehydration unit 222 to reduce water in the sales gas stream to an acceptable level. A first rich solvent stream 223 exits the bottom of the first cold solvent contactor 214. The first rich solvent stream includes the $H_2S$ from the partially-treated gas stream 210 that was separated therefrom in the first cold solvent contactor 214.

The permeate gas stream 212, which as previously described may comprise approximately 50%-95% $CO_2$ or 70-95% $CO_2$, is introduced into a second cold solvent contactor 224. The second cold solvent contactor 224 contacts the permeate gas stream 212 with a second chilled lean solvent stream 226 in a packing layer 225 to separate $H_2S$ out of the permeate gas stream 212. The second chilled lean solvent stream 226 may comprise a hindered amine, and in a preferred aspect has the same composition as the first chilled lean solvent stream 216. The second cold solvent contactor 224 may operate in a similar manner as the first cold solvent contactor 214, and for the sake of brevity its operation will not be further described herein. A cleaned $CO_2$ gas stream 228, substantially free of $H_2S$, exits the top of the second cold solvent contactor 224 to be vented or transported for further use or processing. A second rich solvent stream 230 exits the bottom of the second cold solvent contactor 224. The second rich solvent stream 230 includes the $H_2S$ from the permeate gas stream 212 that was separated therefrom in the second cold solvent contactor 224.

The first and second rich solvent streams 223, 230 are regenerated to separate the $H_2S$ (and residual $CO_2$) from the solvent contained therein. In a preferred aspect, the first and second rich solvent streams are combined and sent to a regenerator 232. Regenerator 232 may include a regeneration vessel, a reboiler, a condenser, and/or an accumulator as shown in FIG. 1 at 120, 122, 126, and 128, respectively, and in the interests of brevity the specific components will not be further described. An $H_2S$-rich gas stream 234 is separated out of the regenerator 232 and may be sent to a sulfur recovery unit (not shown) according to known principles. With the $H_2S$ (and $CO_2$) removed, the solvent now comprises a regenerated or lean solvent stream 236 that can be recirculated to the first and second cold solvent contactors 214, 224. Prior to recirculation, however, the lean solvent stream is cooled or chilled in a refrigeration system 238, which in an aspect may be a propane chiller, an ammonia refrigerator, and/or an absorption chiller. The refrigeration system cools or chills the lean solvent stream 236 to a temperature below the ambient temperature, which may be below 50° F., or below 45° F., or below 40° F., or below 35° F. This differs from known acid gas separation systems that cool the lean amine prior to recirculation only to near the ambient temperature. As previously explained, chilling the lean solvent stream to below ambient temperature may significantly reduce the required solvent flow rate. The first and second chilled lean solvent streams 216, 226 exit the refrigeration system and are recirculated to the first and second cold solvent contactors 214, 224, respectively.

Aspects of the disclosure shown in FIG. 2 rely upon the cooling of the dehydrated gas stream 206 by the gas expansion in the membrane separation system 208. Additional cooling of the partially-treated gas stream 210 and the permeate gas stream 212 may be provided by first and second coolers 242, 244, respectively. This may be done to reduce the temperature of the partially-treated gas stream 210 and the permeate gas stream 212 to a temperature that may be more optimal for use in the first and second cold solvent contactors 214, 224.

The schematic of FIG. 2 is not intended to indicate that the sour gas separation system 200 is to include all the components shown in FIG. 2. Further, any number of additional components may be included within the sour gas separation system 200, depending on the details of the specific implementation. For example, the sour gas separation system 200 may include any suitable types of heaters, chillers, condensers, liquid pumps, gas compressors, filters, blowers, bypass lines, or other types of separation and/or fractionation equipment, valves, switches, controllers, pressure-measuring devices, temperature-measuring devices, level-measuring devices, or flow-measuring devices, among others.

Figure 3:
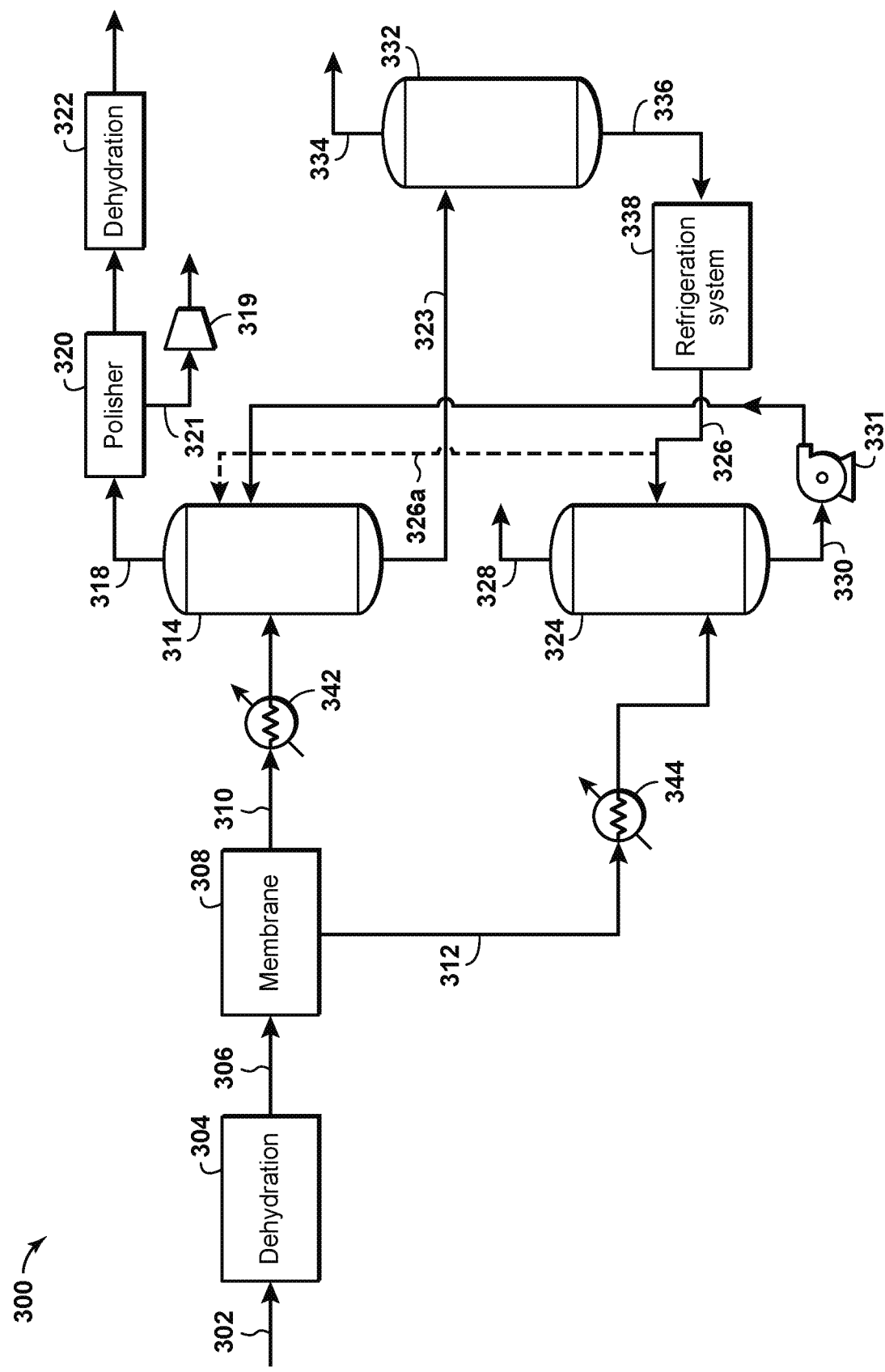
FIG. 3 is a schematic diagram of a natural gas separation system according to still other disclosed aspects.

FIG. 3 is a schematic diagram of a sour gas separation system 300 according to another aspect of the disclosure, which is similar to system 200. System 300 differs from system 200 in that the solvent systems are integrated together. The lightly-loaded chilled solvent from the permeate treatment could be pumped and used as a semi-lean solvent for the cold solvent on the process gas, since the latter will have a higher partial pressure of $H_2S$. As shown in FIG. 3, water is removed from a feed gas stream 302 in a dehydrator 304. The dehydrated gas stream 306 passes through a membrane separation system 308. The membrane separation system operates according to known principles to separate most of the carbon dioxide and hydrogen sulfide present in the dehydrated gas stream. For example, the membrane separation system 308 may produce a partially-treated gas stream 310 with a composition of 6% carbon dioxide ($CO_2$), about 500 parts per million (ppm) of hydrogen sulfide ($H_2S$), with the remainder being natural gas. The membrane separation system 308 may also produce a permeate gas stream 312 with a composition of 50%-95% $CO_2$ and 0.001%-5.0% $H_2S$, or 70-95% carbon dioxide and 0.1-2.0% $H_2S$, with the remainder being natural gas. The temperature of the partially-treated gas stream 310 may be reduced to about 50° F. and its pressure reduced to about 500 psig, while the temperature of the permeate gas stream 312 may be reduced to about 70° F. and its pressure reduced to about 100 psig.

According to disclosed aspects, the partially-treated gas stream 310 is introduced into a first cold solvent contactor 314. The permeate gas stream 312 is introduced into a second cold solvent contactor 324. The second cold solvent contactor 324 contacts the permeate gas stream 312 with a chilled lean solvent stream 326 to separate $H_2S$ out of the permeate gas stream 312. The chilled lean solvent stream 326 may comprise a hindered amine, such as Flexsorb/SE, as previously described. A cleaned $CO_2$ gas stream 328, substantially free of $H_2S$, exits the top of the second cold solvent contactor 324 to be vented or transported for further use or processing. A semi-lean solvent stream 330 exits the bottom of the second cold solvent contactor 324. The semi-lean solvent stream 330 includes the $H_2S$ from the permeate gas stream 312 that was separated therefrom in the second cold solvent contactor 324. The semi-lean solvent stream 330 is pumped using pump 331 to the first cold solvent contactor 314, which contacts the partially-treated gas stream 310 with the semi-lean solvent stream to separate $H_2S$ out of the partially-treated gas stream 310.

A fully-treated gas stream 318 exits the top of the first cold solvent contactor 314. The fully-treated gas stream 318 is rich in natural gas and is very low in acid gas. To meet pipeline specifications, the acid gas concentration in the fully-treated gas stream 318 may be further reduced in a polishing unit 320 and further processed through a dehydration unit 322 as described in previous aspects. A carbon dioxide gas stream 321, separated from the fully-treated gas stream 318 in the polishing unit, may be re-compressed in a compressor 319 and combined with a cleaned $CO_2$ gas stream 328 as further described herein. A rich solvent stream 323 exits the bottom of the first cold solvent contactor 314. The rich solvent stream includes the $H_2S$ from the partially-treated gas stream 310 that was separated therefrom in the first cold solvent contactor 314. In an aspect, a slipstream 326a of chilled lean solvent stream 326 is sent to the top of the first cold solvent contactor 314 above semi-lean solvent stream 330 to further reduce $H_2S$ in the partially-treated gas stream.

The rich solvent stream 323 is regenerated in a regenerator 332, which separates the $H_2S$ (and $CO_2$) from the solvent in the rich solvent stream. Regenerator 332 may include a regeneration vessel, a reboiler, a condenser, and/or an accumulator as shown in FIG. 1 at 120, 122, 126, and 128, respectively, and in the interests of brevity the specific components will not be further described. An $H_2S$-rich gas stream 334 is separated out of the regenerator 332 and may be sent to a sulfur recovery unit (not shown) according to known principles. With the $H_2S$ removed, the solvent now comprises a lean solvent stream 336 that can be recirculated to the second cold solvent contactor 324. Prior to recirculation, however, the lean solvent stream is cooled or chilled in a refrigeration system 338, which cools or chills the lean solvent stream 336 to a temperature below the ambient temperature, which may be below 50° F., or below 45° F., or below 40° F., or below 35° F. This differs from known acid gas separation systems that cool the lean amine prior to recirculation only to near ambient temperature. As previously explained, chilling the lean solvent stream to below ambient temperature may significantly reduce the required solvent flow rate. The chilled lean solvent stream 326 exits the refrigeration system and is recirculated to the second cold solvent contactor.

Aspects of the disclosure shown in FIG. 3 rely upon the cooling of the dehydrated gas stream 306 by the membrane separation system 308. Additional cooling of the partially-treated gas stream 310 and the permeate gas stream 312 may be provided by first and second coolers 342, 344, respectively. This may be done to reduce the temperature of the partially-treated gas stream 310 and the permeate gas stream 312 to a temperature that may be more optimal for use in the first and second cold solvent contactors 314, 324.

The schematic of FIG. 3 is not intended to indicate that the sour gas separation system 300 is to include all the components shown in FIG. 3. Further, any number of additional components may be included within the sour gas separation system 300, depending on the details of the specific implementation. For example, the sour gas separation system 300 may include any suitable types of heaters, chillers, condensers, liquid pumps, gas compressors, filters, blowers, bypass lines, or other types of separation and/or fractionation equipment, valves, switches, controllers, pressure-measuring devices, temperature-measuring devices, level-measuring devices, or flow-measuring devices, among others.

Figure 4:
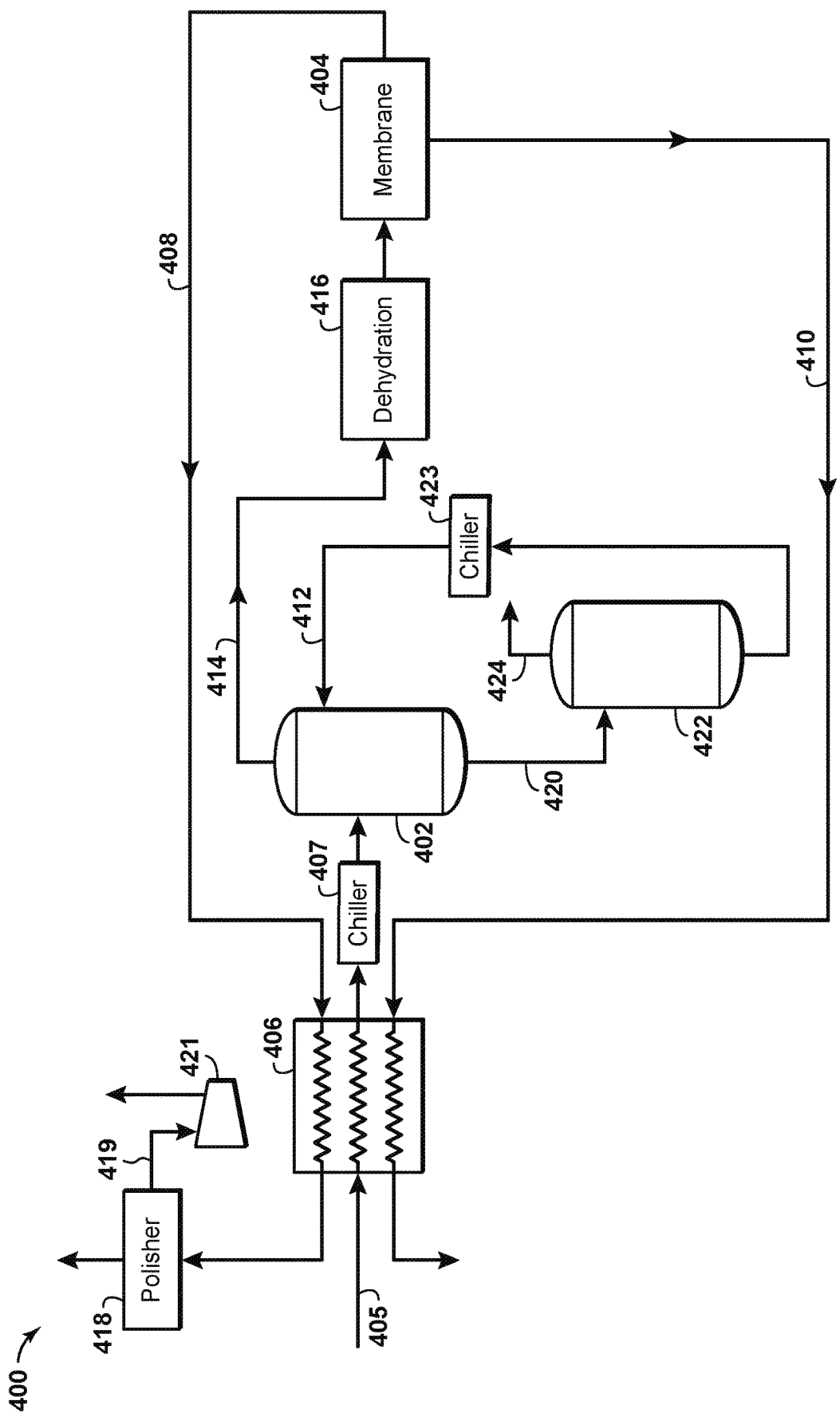
FIG. 4 is a schematic diagram of a natural gas separation system according to yet other disclosed aspects.

FIG. 4 depicts a sour gas separation system 400 according to another aspect of the disclosure, in which a single cold solvent contactor 402 is deployed upstream of the membrane system 404. In this aspect, the feed gas stream 405 could be chilled in a heat exchanger 406 by cross-exchanging with one or more of the outlets from the membrane system 404, which may include a fully-treated gas stream 408 and/or a permeate gas stream 410. After being chilled in the heat exchanger 406 to a temperature of about 50° F., for example, the feed gas stream 405, which may be considered a chilled gas stream, may be further chilled in a refrigeration system or chiller 407 and introduced into the cold solvent contactor 402. The cold solvent contactor 402 contacts the feed gas stream 405 with a lean solvent stream 412 according to known principles to separate $H_2S$ out of the feed gas stream 405. The lean solvent stream 412 may comprise a hindered amine which, as previously described, achieves selective $H_2S$ removal by reacting more quickly with $H_2S$ than with $CO_2$. As previously described, providing a very short contact time (via a shorter packing height or using a co-current contactor, for example) between the sour gas and amine allows the amine just enough time to pick up the $H_2S$ but too little contact time to react with an appreciable amount of $CO_2$. Thus, more $CO_2$ slips, and less solvent is required.

A partially-treated gas stream 414 exits the top of the cold solvent contactor 402. A dehydrator 416 removes water from the partially-treated gas stream 414, and the treated gas stream is then introduced into the membrane separation system 404. The membrane system 404 operates according to known principles to separate most of the carbon dioxide and hydrogen sulfide present in the partially-treated gas stream 414. For example, the membrane system 404 may produce a fully-treated gas stream 408 with a composition of 2%-6% $CO_2$ at a temperature of about 30° F. and a pressure of about 500 psig. The membrane separation system 404 may also produce a permeate gas stream 410 having a composition of 50%-95% $CO_2$, or 70-95% $CO_2$, with the remainder being primarily natural gas with little to no $H_2S$. To meet pipeline specifications, the $H_2S$ concentration in the sales gas stream 408 may be further reduced in a polishing unit 418 as previously explained. A carbon dioxide gas stream 419, separated from the treated gas stream 414 in the polishing unit, may be re-compressed in a compressor 421 and combined with the permeate gas stream 410. A rich solvent stream 420 exits the bottom of the cold solvent contactor 402. The rich solvent stream 420 includes the $H_2S$ from the feed gas stream 405 that is separated therefrom in the cold solvent contactor 402. The rich solvent stream 420 is fed to a regenerator 422 that separates the $H_2S$ (and at least some $CO_2$) from the solvent. An $H_2S$-rich gas stream 424 exits the regenerator 422 and may be sent to a sulfur recovery unit (not shown) according to known principles. The lean solvent stream 412 may be cooled by a refrigeration system or chiller 423 before being recirculated to the cold solvent contactor 402.

The schematic of FIG. 4 is not intended to indicate that the sour gas separation system 400 is to include all the components shown in FIG. 4. Further, any number of additional components may be included within the sour gas separation system 400, depending on the details of the specific implementation. For example, the sour gas separation system 400 may include any suitable types of heaters, chillers, condensers, liquid pumps, gas compressors, filters, blowers, bypass lines, or other types of separation and/or fractionation equipment, valves, switches, controllers, pressure-measuring devices, temperature-measuring devices, level-measuring devices, or flow-measuring devices, among others.

The aspect disclosed in FIG. 4 has several advantages. For example, only a single cold solvent contactor and dehydration system would be required, as opposed to two cold solvent contactors and two to three dehydration systems as shown in other Figures herein. Dehydration takes place at high pressure and low temperature, in which the gas contains less water, particularly for the low pressure permeate system. The entire membrane system operates without the presence of $H_2S$, thereby improving plant safety. Additionally, the feed gas to the membrane system may now be cooler, which increases the selectivity to the permeating species, so the CO$_2$ stream has a lower hydrocarbon content. This last advantage could be applicable regardless of the use of the specific cold solvent(s) disclosed herein for use with the depicted aspects.

Throughout the disclosure reference is made to gas streams that are 'partially-treated' and 'fully-treated'. These terms are relative to each other, and their use does not imply that a fully-treated gas stream cannot be subject to additional processes or treatments.

The cold solvent contactors depicted in FIGS. 2-4 and described herein are shown as conventional contacting vessels in which an upwardly moving gas stream contacts a downwardly moving solvent in a packing section. According to aspects of the disclosure, the height of the packing sections is reduced to minimize the absorption of CO$_2$ by the solvent. In another aspect, any of the disclosed cold solvent contactors may operate according to a co-current flow scheme in which the gas stream is moving in the same direction as the solvent it is contacting. The co-current flow scheme may include one or more co-current contacting systems connected in parallel, in series within a pipe, or a combination of parallel and series configurations. A natural gas stream and a solvent stream may move together, i.e., co-currently, within each co-current contacting system. In general, co-current contactors can operate at much higher fluid velocities than counter-current contacting systems. As a result, co-current contacting systems tend to be smaller than counter-current contactors that use standard towers with packing or trays. Further, the co-current contacting systems are smaller than conventional pressure vessels of equivalent processing capacity, and thus are more suited to modular design/construction, offshore deployment, de-bottlenecking applications, and applications where visual pollution may be a factor. In selective H$_2$S and/or CO$_2$ separation applications, two to three co-current contacting systems in series may be used to separate said impurities from a gas stream. Additionally, the dehydration and/or polishing steps performed in the disclosed aspects may be performed by one or more co-current contacting systems.

Figure 5:
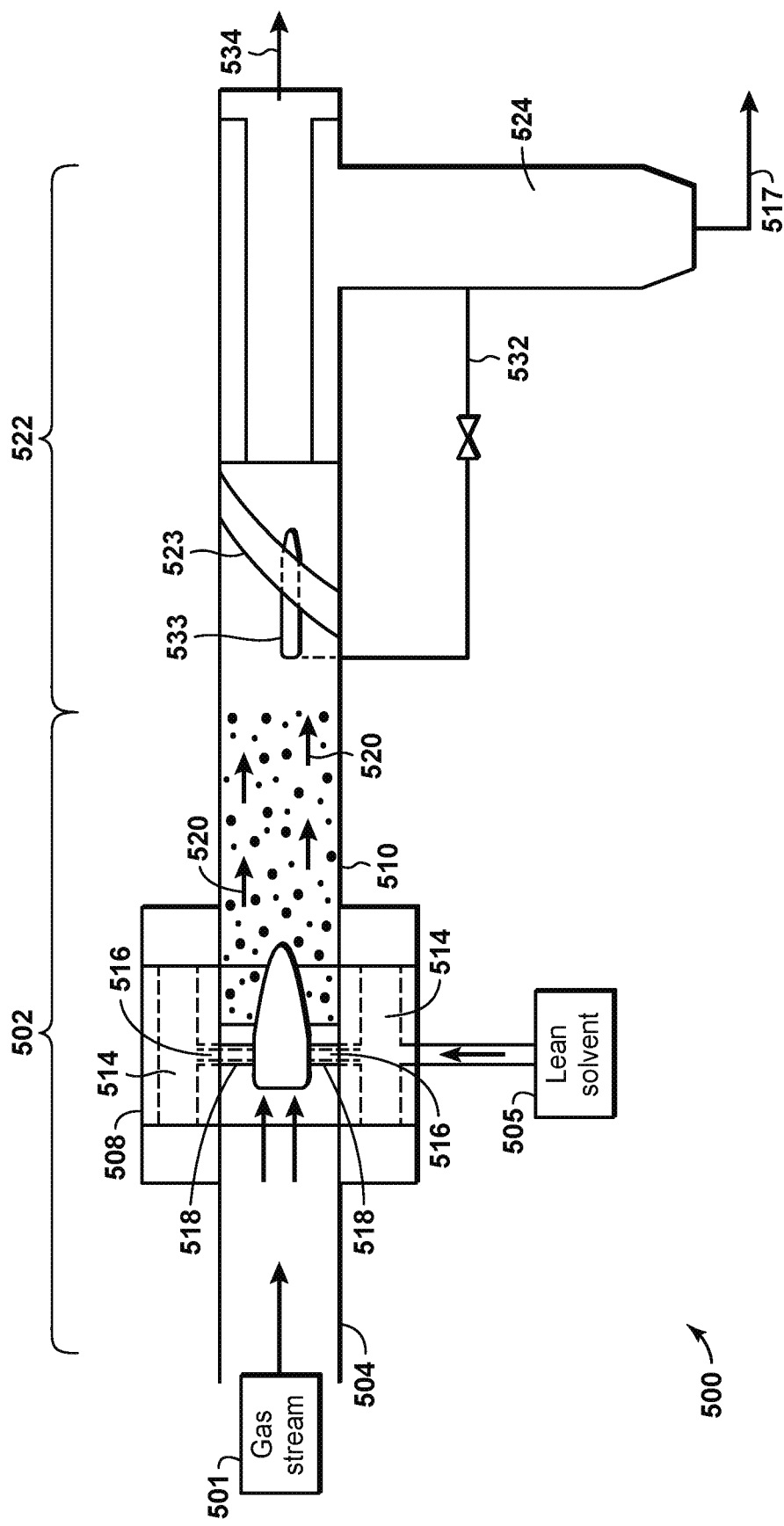
FIG. 5 is a side elevational view of a co-current contacting system according to disclosed aspects.

FIG. 5 illustrates the co-current contacting system 500 in further detail. The co-current contacting system 500 can provide for the separation of components within a gas stream, such as a natural gas stream 501. The co-current contacting system 500 can include a co-current contactor 502 that is positioned in-line within a pipe 504. The co-current contactor 502 may include a number of components that provide for the efficient contacting of a liquid droplet stream, such as a lean solvent stream 505, with a flowing gas stream, such as natural gas stream 501, for the separation of hydrogen sulfide (H$_2$S) from the natural gas stream 501.

The co-current contactor 502 may include a droplet generator 508 and a mass transfer section 510. As shown in FIG. 5, the natural gas stream 501 may be flowed through the pipe 504 and into the droplet generator 508. The lean solvent stream 505 may also be flowed into the droplet generator 508, for example through a hollow space 514 coupled to flow channels 516 in the droplet generator 508.

From the flow channels 516, the lean solvent stream 505 is released into the natural gas stream 501 as fine droplets through injection orifices 518, and is then flowed into the mass transfer section 510. This can result in the generation of a treated gas stream 520 within the mass transfer section 510. The treated gas stream 520 may include small liquid droplets dispersed in a gas phase. For H$_2$S separation processes, the liquid droplets may include H$_2$S molecules from the natural gas stream 501 that are absorbed or dissolved into the lean solvent stream 505.

The treated gas stream 520 may be flowed from the mass transfer section 510 to a separation system 522, which includes a cyclonic separator 523 and a collector 524. Alternatively the separation system may include a mesh screen, or a settling vessel. Preferably, in-line cyclonic separators may be used to realize the benefits of compactness and reduced diameter. The cyclonic separator 523 removes the liquid droplets from the gas phase. The liquid droplets, which as previously stated may include H$_2$S absorbed or dissolved into the lean solvent stream 505, are diverted into collector 524, which directs the collected liquids as a rich solvent stream 517 to a regenerator (not shown). A pressure equalization line 532 may extend from the collector 524 and operates to allow gas in the collector to return to the separation system 522. In an aspect, this gas flows via a nozzle 533 or eductor situated inside the separation system 522. A processed gas stream 534, from which the H$_2$S and rich solvent has been separated, exits the separation system 522 in an in-line orientation with the pipe 504. The amount of H$_2$S in processed gas stream 534, as measured in weight percentage, is lower than the amount of H$_2$S in natural gas stream 501.

Figure 6A:
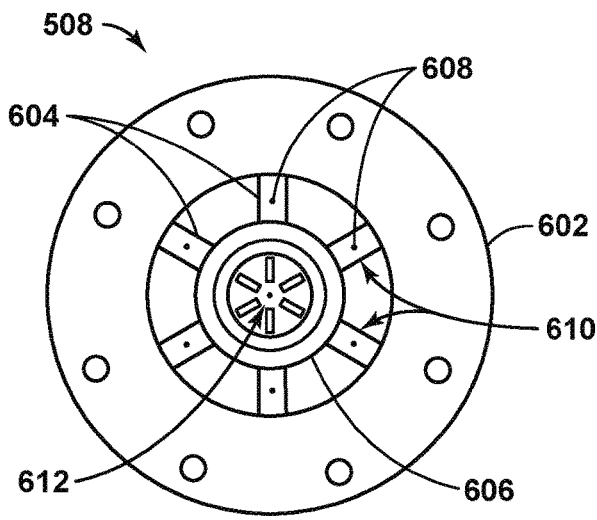
FIGS. 6A-6D are side elevational views and perspective views of droplet generators according to disclosed aspects.

FIG. 6A is a front view of droplet generator 508 according to disclosed aspects. The droplet generator 508 is a contacting device that may be implemented within a co-current contactor, for example, in the co-current contactor 502 described with respect to the co-current contacting system 500 of FIG. 5. The front view of the droplet generator 508 represents an upstream view of the droplet generator.

The droplet generator 508 may include an outer annular support ring 602, a number of spokes 604 extending from the annular support ring 602, and a gas entry cone 606. The annular support ring 602 may secure the droplet generator 508 in-line within the pipe. In addition, the spokes 604 may provide support for the gas entry cone 606.

The annular support ring 602 may be designed as a flanged connection, or as a removable or fixed sleeve inside the pipe. In addition, the annular support ring 602 may include a liquid feed system and a hollow channel described further with respect to FIGS. 6C and 6D. A liquid stream, such as a lean solvent stream 505, may be fed to the droplet generator 508 via the hollow channel in the annular support ring 602. The lean solvent stream 505 may comprise a solvent such as Flexsorb/SE. The hollow channel may allow equal distribution of the liquid stream along the perimeter of the droplet generator 508.

Small liquid channels within the annular support ring 602 may provide a flow path for the lean solvent stream to flow through liquid injection orifices 608 within the spokes 604. The liquid injection orifices 608 may be located on or near the leading edge of each spoke 604. Placement of the liquid injection orifices 608 on the spokes 604 may allow the lean solvent stream to be uniformly distributed in a gas stream that is directed between the spokes 604. Specifically, the lean solvent stream may be contacted by the portion of the natural gas stream 501 flowing through the gaps between the spokes 604, and can be sheared into small droplets and entrained in the gas phase.

A portion of the natural gas stream flows between the spokes to the mass transfer section while the remainder of the gas stream flows into the gas entry cone 606 through a gas inlet 612. The gas entry cone 606 may block a cross-sectional portion of the pipe. The spokes 604 include gas exit slots 610 that allow the natural gas stream to lie flowed out of the gas entry cone 606. This may increase the velocity of the natural gas stream as it flows through the pipe. The gas entry cone 606 may direct a predetermined amount of the natural gas stream to the gas exit slots 610 on the spokes 604.

Some of the lean solvent stream injected through the spokes 604 may be deposited on the surface of the spokes 604 as a liquid film. As the natural gas stream flows through the gas entry cone 606 and is directed out of the gas exit slots 610 on the spokes 604, the natural gas stream may sweep, or blow, much of the liquid film off the surface of the spokes 604. This may enhance the dispersion of the lean solvent stream into the gas phase. Further, the obstruction to the flow of the natural gas stream and the shearing effect created by the exit of the natural gas stream gas through the gas exit slots may provide a zone with an increased turbulent dissipation rate. This may result in the generation of smaller droplets that enhance the mass transfer rate between the lean solvent stream and the natural gas stream.

The dimensions of various components of the droplet generator 508 may be varied such that the natural gas stream flows at a high velocity. This may be accomplished via either a sudden reduction in the diameter of the annular support ring 602 or a gradual reduction in the diameter of the annular support 602. The outer wall of the droplet generator 508 may be slightly converging in shape, terminating at the point where the natural gas stream and the lean solvent stream are discharged into the downstream pipe. This can allow for the shearing and re-entrainment of any solvent film that is removed from the droplet generator 508. Further, a radial inward ring, grooved surface, or other suitable equipment may be included on the outer diameter of the droplet generator 508 near the point where the natural gas stream and the lean solvent stream are discharged into the downstream pipe. This may enhance the degree of liquid entrainment within the gas phase.

The downstream end of the droplet generator 508 may discharge into a section of pipe (not shown). The section of pipe can be a straight section of pipe, or a concentrically expanding section of pipe. The gas entry cone 606 may terminate with a blunt ended cone or a tapered ended cone. In other aspects, the gas entry cone 606 can terminate with a ridged cone, which can include multiple concentric ridges along the cone that provide multiple locations for droplet generation. In addition, any number of gas exit slots 610 may be provided on the cone itself to allow for the removal of solvent film from the droplet generator 508.

Figure 6B:
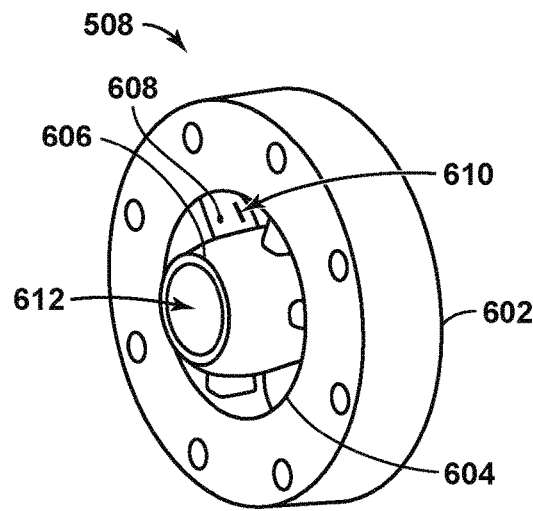

FIG. 6B is a side perspective view of the droplet generator 508. Like numbered items are as described with respect to FIG. 6A. As shown in FIG. 6B, the upstream portion of the gas entry cone 606 may extend further into the pipe than the annular support ring 602 and the spokes 604 in the upstream direction. The downstream portion of the gas entry cone 606 can also extend further into the pipe than the annular support ring 602 and the spokes 604 in the downstream direction. The length of the gas entry cone 606 in the downstream direction depends on the type of cone at the end of the gas entry cone 606, as described further with respect to FIGS. 6C and 6D.

Figure 6C:
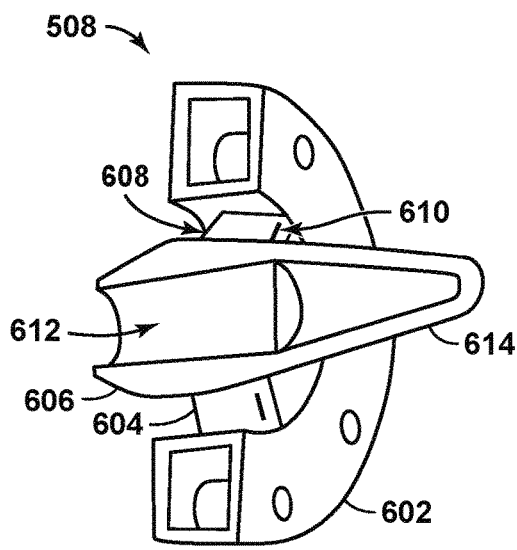

FIG. 6C is a cross-sectional side perspective view of the droplet generator 508 according to a disclosed aspect. Like numbered items are as described with respect to FIGS. 6A and 6B. According to FIG. 6C, the gas entry cone 606 of the droplet generator 508 terminates with a tapered ended cone 614. Terminating the gas entry cone 606 with a tapered ended cone 614 may reduce the overall pressure drop in the pipe caused by the droplet generator 508.

Figure 6D:
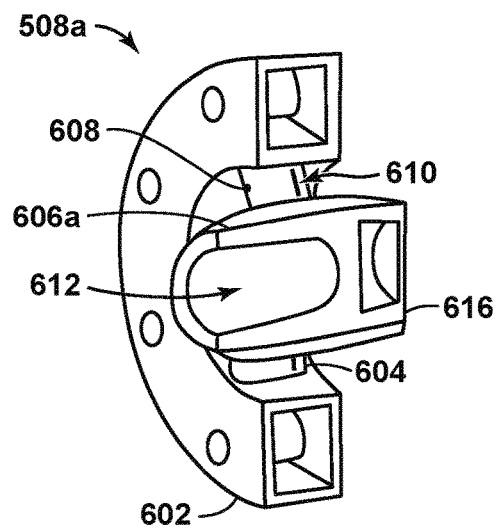

FIG. 6D is a cross-sectional side perspective view of the droplet generator 508a according to another disclosed aspect. Like numbered items are as described with respect to FIGS. 6A-6C. According to FIG. 6D, the gas entry cone 606a of the droplet generator 508a terminates with a blunt ended cone 616. Terminating the gas entry cone 606a with a blunt ended cone 616 may encourage droplet formation in the center of the pipe.

Figure 7:
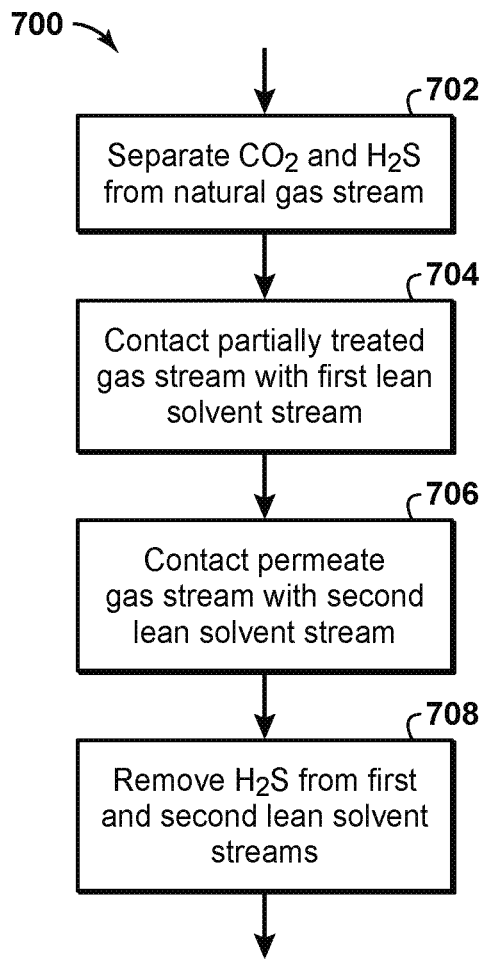
FIG. 7 is a flowchart of a method according to aspects of the disclosure.

FIG. 7 is a flowchart of a method 700 of separating impurities from a natural gas stream according to disclosed aspects. At block 702 carbon dioxide ($CO_2$) and hydrogen sulfide ($H_2S$) are separated from the natural gas stream in a membrane separation system, thereby creating a partially-treated gas stream and a permeate gas stream. The permeate gas stream is comprised primarily of $H_2S$ and $CO_2$. The partially-treated gas stream is comprised primarily of natural gas. The partially-treated gas stream and the permeate gas stream are at a lower temperature than the natural gas stream. At block 704 the partially-treated gas stream is contacted with a first lean solvent stream in a first contactor to separate $H_2S$ from the partially treated gas stream, thereby producing a first rich solvent stream and a fully-treated gas stream. At block 706 the permeate gas stream is contacted with a second lean solvent stream in a second contactor to separate $H_2S$ therefrom, to produce a second rich solvent stream and a $CO_2$ gas stream. At block 708 is removed from the first and second rich solvent streams, thereby producing the first and second lean solvent streams.

Figure 8:
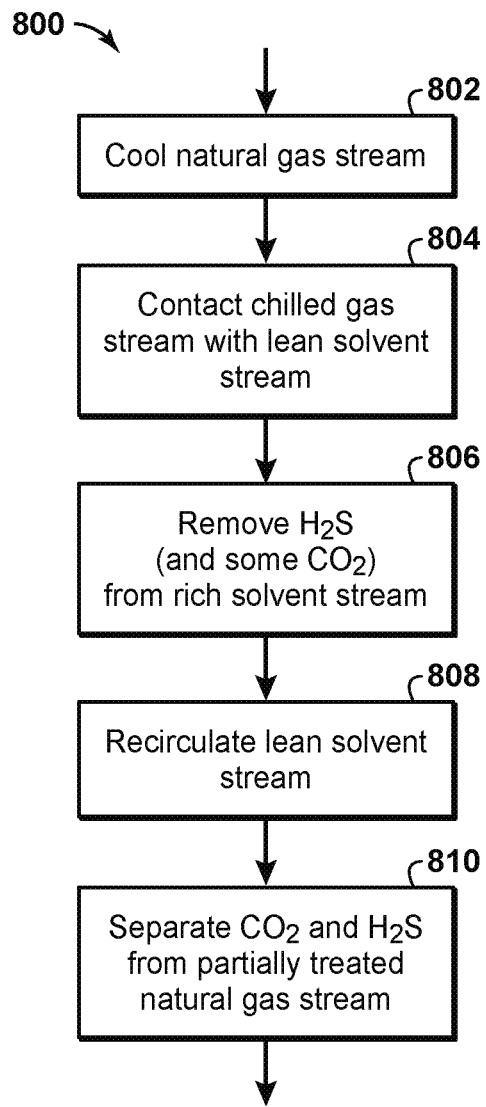
FIG. 8 is a flowchart of a method according to aspects of the disclosure.

FIG. 8 is a flowchart of a method 800 of separating impurities from a natural gas stream according to aspects of the disclosure. At block 802 the natural gas stream is cooled through heat exchange with one or more process streams to produce a chilled gas stream. At block 804 the chilled gas stream is contacted with a lean solvent stream in a contactor to separate hydrogen sulfide ($H_2S$) from the chilled gas stream, thereby producing a rich solvent stream and a partially-treated gas stream. At block 806 $H_2S$ and at least some $CO_2$ is removed from the rich solvent stream to produce the lean solvent stream. At block 808 the lean solvent stream is recirculated to the contactor. At block 810 $CO_2$ and $H_2S$ are separated from the partially-treated gas stream in a membrane separation system, thereby creating a fully-treated gas stream and a permeate gas stream. The permeate gas stream is comprised primarily of $H_2S$ and $CO_2$. The fully-treated gas stream is comprised primarily of natural gas. The fully-treated gas stream and the permeate gas stream are at a lower temperature than the partially-treated gas stream. The fully-treated gas stream and the permeate gas stream comprise the one or more process streams.

The steps depicted in FIGS. 7 and 8 are provided for illustrative purposes only and a particular step may not be required to perform the disclosed methodology. Moreover, FIGS. 7 and 8 may not illustrate all the steps that may be performed. The claims, and only the claims, define the disclosed system and methodology.

The aspects described herein have several advantages over known technologies. For example, the described technology may greatly reduce the size and cost of systems that treat sour natural gas.

Aspects of the disclosure may include any combinations of the methods and systems shown in the following numbered paragraphs. This is not to be considered a complete listing of all possible aspects, as any number of variations can be envisioned from the description above.

1. A method of separating impurities from a natural gas stream, comprising:

cooling the natural gas stream through heat exchange with one or more process streams to produce a chilled gas stream;

contacting the chilled gas stream with a lean solvent stream in a contactor to separate hydrogen sulfide ($H_2S$) from the chilled gas stream, thereby producing a rich solvent stream and a partially-treated gas stream;

removing $H_2S$ and carbon dioxide ($CO_2$) from the rich solvent stream to produce the lean solvent stream;

recirculating the lean solvent stream to the contactor; and separating $CO_2$ and $H_2S$ from the partially-treated gas stream in a membrane separation system, thereby creating a fully-treated gas stream and a permeate gas stream, the permeate gas stream being comprised primarily of $H_2S$ and $CO_2$, and the fully-treated gas stream being comprised primarily of natural gas, wherein the fully-treated gas stream and the permeate gas stream are at a lower temperature than the partially-treated gas stream;

wherein the fully-treated gas stream and the permeate gas stream comprise the one or more process streams.

2. The method of paragraph 1, further comprising:

removing $CO^2$ from the fully-treated gas stream in a polisher.

3. The method of 1, further comprising:

compressing the $CO^2$ removed from the fully-treated gas stream in the polisher.

4. The method of any one of paragraphs 1-3, further comprising:

cooling the lean solvent stream prior to recirculating the lean solvent stream to the contactor.

5. The method of any one of paragraphs 1-4, further comprising:

further cooling the natural gas stream prior to contacting the chilled gas stream with the lean solvent stream in the contactor.

6. The method of paragraph 1, further comprising:

removing water from the partially-treated gas stream prior to separating $H^2S$ and $CO^2$ from the partially-treated gas stream.

7. The method of any of paragraphs 1-6, wherein the lean solvent stream comprises a hindered amine.

8. The method of paragraph 1, wherein the contactor is a co-current contacting system, and further comprising:

receiving the chilled gas stream and the lean solvent stream in the co-current contacting system located in-line within a pipe, the co-current contacting system including a droplet generator and a mass transfer section;

using the droplet generator, generating droplets from the lean solvent stream and dispersing the droplets into the chilled gas stream;

using the mass transfer section, providing a mixed, two-phase flow having a vapor phase and a liquid phase, wherein the liquid phase includes the rich solvent stream with $H_2S$ and/or $CO_2$ absorbed from the chilled gas stream, and wherein the vapor phase includes the partially-treated gas stream; and separating the vapor phase from the liquid phase.

9. The method of paragraph 8, wherein the droplet generator comprises:

an annular support ring securing the droplet generator in-line within the pipe;

a plurality of spokes extending from the annular support ring, the annular support ring having a plurality of liquid channels allowing the lean solvent stream to flow through the plurality of spokes and out of injection orifices disposed on the plurality of spokes; and a gas entry cone supported by the plurality of spokes and allowing a first portion of the chilled gas stream to flow through a hollow section of the gas entry cone and through gas exit slots included in the plurality of spokes, and a second portion of the chilled gas stream to flow around the gas entry cone and between the plurality of spokes, wherein the second portion of the chilled gas stream is separate from the first portion of the chilled gas stream.

10. The method of any of paragraphs 8-9, wherein the co-current contacting system is one of a plurality of co-current contacting systems connected in series, said plurality of co-current contacting systems including a last co-current contacting system;

wherein each of the plurality of co-current contacting system comprises:

a co-current contactor including a droplet generator and a mass transfer section, the droplet generator generating droplets of a liquid stream and dispersing the droplets into a gas stream received from a previous co-current contacting system, and the mass transfer section providing a mixed, two-phase flow having a vapor phase and a liquid phase; and a separation system that separates the vapor phase from the liquid phase, wherein the vapor phase includes a gas stream and the liquid phase includes liquid from which droplets are generated in a co-current contactor of a previous co-current contacting system.

11. The method of any of paragraphs 1-10, wherein the natural gas stream is cooled through heat exchange with the sales gas stream and the permeate gas stream.

12. A system for separating impurities from a natural gas stream, comprising:

a heat exchanger that cools the natural gas stream through heat exchange with one or more process streams, thereby producing a chilled gas stream;

a contactor configured to contact the chilled gas stream with a lean solvent stream to separate hydrogen sulfide ($H_2S$) from the chilled gas stream, thereby producing a rich solvent stream and a partially-treated gas stream;

a regenerator configured to remove $H_2S$ and carbon dioxide ($CO_2$) from the rich solvent stream to produce the lean solvent stream that is recirculated to the contactor; and a membrane separation system configured to separate $CO_2$ and $H_2S$ from the partially-treated gas stream, thereby creating a fully-treated gas stream and a permeate gas stream, the permeate gas stream being comprised primarily of $H_2S$ and $CO_2$, and the fully-treated gas stream being comprised primarily of natural gas, wherein the fully-treated gas stream and the permeate gas stream are at a lower temperature than the partially-treated gas stream;

wherein the fully-treated gas stream and the permeate gas stream comprise the one or more process streams.

13. The system of paragraph 12, further comprising:

a polisher configured to remove $H_2S$ from the fully-treated gas stream.

14. The system of 12, further comprising:

a compressor configured to compress the $CO_2$ removed from the fully-treated gas stream in the polisher.

15. The system of any one of paragraphs 12-14, further comprising:

a chiller configured to cool the lean solvent stream prior to recirculating the lean solvent stream to the contactor.

16. The system of any one of paragraphs 12-15, further comprising:

a chiller configured to further cool the natural gas stream prior to contacting the chilled gas stream with the lean solvent stream in the contactor.

17. The system of paragraph 12, further comprising:
a dehydrator configured to remove water from the partially-treated gas stream prior to separating $H_2S$ and $CO_2$ from the partially-treated gas stream.

18. The system of any one of paragraphs 12-17, wherein the lean solvent stream comprises a hindered amine.

19. The system of any one of paragraphs 12-18, wherein the contactor is a co-current contacting system located in-line within a pipe, the co-current contacting system receiving the chilled gas stream and the lean solvent stream, the co-current contacting system including
a co-current contactor including a droplet generator and a mass transfer section, the droplet generator configured to generate droplets from the lean solvent stream and to disperse the droplets into the chilled gas stream, and the mass transfer section configured to provide a mixed, two-phase flow having a vapor phase and a liquid phase, wherein the liquid phase includes the lean solvent stream with $H_2S$ and/or $CO_2$ absorbed from the gas stream, and wherein the vapor phase includes the chilled gas stream; and
a separation system configured to separate the vapor phase from the liquid phase.

20. The system of paragraph 19, wherein the droplet generator comprises:
an annular support ring securing the droplet generator in-line within the pipe;
a plurality of spokes extending from the annular support ring, the annular support ring having a plurality of liquid channels allowing the lean solvent stream to flow through the plurality of spokes and out of injection orifices disposed on the plurality of spokes; and
a gas entry cone supported by the plurality of spokes and allowing
a first portion of the chilled gas stream to flow through a hollow section of the gas entry cone and through gas exit slots included in the plurality of spokes, and
a second portion of the chilled gas stream to flow around the gas entry cone and between the plurality of spokes, wherein the second portion of the chilled gas stream is separate from the first portion of the chilled gas stream.

21. The system of any one of paragraphs 19-20, wherein the co-current contacting system is one of a plurality of co-current contacting systems connected in series, said plurality of co-current contacting systems including a last co-current contacting system;
wherein each of the plurality of co-current contacting system comprises
a co-current contactor including a droplet generator and a mass transfer section, the droplet generator generating droplets of the lean solvent stream and dispersing the droplets into a gas stream received from a previous co-current contacting system, and the mass transfer section providing a mixed, two-phase flow having a vapor phase and a liquid phase; and
a separation system that separates the vapor phase from the liquid phase, wherein the vapor phase includes a treated gas stream and the liquid phase includes liquid from which droplets are generated in a co-current contactor of a previous co-current contacting system.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method of separating impurities from a natural gas stream, comprising:
cooling the natural gas stream through heat exchange with one or more process streams to produce a chilled gas stream;
contacting the chilled gas stream with a lean solvent stream comprising a hindered amine in a contactor to separate hydrogen sulfide ($H_2S$) and carbon dioxide ($CO_2$) from the chilled gas stream, thereby producing a rich solvent stream and a partially-treated gas stream;
removing $H_2S$ and $CO_2$ from the rich solvent stream to produce the lean solvent stream;
recirculating the lean solvent stream to the contactor; and
separating $CO_2$ and $H_2S$ from the partially-treated gas stream in a membrane separation system, thereby creating a fully-treated gas stream and a permeate gas stream, the permeate gas stream being comprised of $H_2S$ and $CO_2$ and having a higher concentration of $H_2S$ and $CO_2$ than the partially-treated gas stream, and the fully-treated gas stream being comprised of natural gas and having a lower concentration of $H_2S$ and $CO_2$ than the partially-treated gas stream, wherein the fully-treated gas stream and the permeate gas stream are at a lower temperature than the partially-treated gas stream;
wherein the fully-treated gas stream and the permeate gas stream comprise the one or more process streams;
wherein the contactor is a co-current contacting system and wherein contacting the chilled gas stream with a lean solvent stream further comprises:
receiving the chilled gas stream and the lean solvent stream in the co-current contacting system located in-line within a pipe, the co-current contacting system including a droplet generator and a mass transfer section;
using the droplet generator, generating droplets from the lean solvent stream and dispersing the droplets into the chilled gas stream;
using the mass transfer section, providing a mixed, two-phase flow having a vapor phase and a liquid phase, wherein the liquid phase includes the rich solvent stream with $H_2S$ and/or $CO_2$ absorbed from the chilled gas stream, and wherein the vapor phase includes the partially-treated gas stream; and
separating the vapor phase from the liquid phase.

2. The method of claim 1, further comprising:
removing $CO_2$ from the fully-treated gas stream in a polisher.

3. The method of 1, further comprising:
compressing the $CO_2$ removed from the fully-treated gas stream in the polisher.

4. The method of claim 1, further comprising:
cooling the lean solvent stream prior to recirculating the lean solvent stream to the contactor.

5. The method of claim 1, further comprising:
further cooling the natural gas stream prior to contacting the chilled gas stream with the lean solvent stream in the contactor.

6. The method of claim 1, further comprising:
removing water from the partially-treated gas stream prior to separating $H_2S$ and $CO_2$ from the partially-treated gas stream.

7. The method of claim 1, wherein the droplet generator comprises:
- an annular support ring securing the droplet generator in-line within the pipe;
- a plurality of spokes extending from the annular support ring, the annular support ring having a plurality of liquid channels allowing the lean solvent stream to flow through the plurality of spokes and out of injection orifices disposed on the plurality of spokes; and
- a gas entry cone supported by the plurality of spokes and allowing
  - a first portion of the chilled gas stream to flow through a hollow section of the gas entry cone and through gas exit slots included in the plurality of spokes, and
  - a second portion of the chilled gas stream to flow around the gas entry cone and between the plurality of spokes, wherein the second portion of the chilled gas stream is separate from the first portion of the chilled gas stream.

8. The method of claim 1, wherein the co-current contacting system is one of a plurality of co-current contacting systems connected in series, said plurality of co-current contacting systems including a last co-current contacting system;
- wherein each of the plurality of co-current contacting system comprises
  - a co-current contactor including a droplet generator and a mass transfer section, the droplet generator generating droplets of a liquid stream and dispersing the droplets into a gas stream received from a previous co-current contacting system, and the mass transfer section providing a mixed, two-phase flow having a vapor phase and a liquid phase; and
  - a separation system that separates the vapor phase from the liquid phase, wherein the vapor phase includes a gas stream and the liquid phase includes liquid from which droplets are generated in a co-current contactor of a previous co-current contacting system.

9. The method of claim 1, wherein the natural gas stream is cooled through heat exchange with the fully-treated gas stream and the permeate gas stream.

* * * * *